United States Patent [19]

Semp et al.

[11] 4,298,013
[45] Nov. 3, 1981

[54] METHOD FOR RECYCLING CELLULOSIC WASTER MATERIALS FROM TOBACCO PRODUCT MANUFACTURE

[75] Inventors: Bernard A. Semp; Daniel M. Teng; Gus D. Keritsis, all of Richmond, Va.

[73] Assignee: Philip Morris, Inc., New York, N.Y.

[21] Appl. No.: 144,227

[22] Filed: Apr. 28, 1980

[51] Int. Cl.³ .......................... A24B 3/00; A24B 3/12
[52] U.S. Cl. .................................... 131/308; 131/310
[58] Field of Search ............... 131/140 R, 140 B, 141, 131/142, 143, 144, 133; 195/33

[56] References Cited

U.S. PATENT DOCUMENTS

| | | | |
|---|---|---|---|
| 3,591,457 | 7/1971 | Bender et al. | 195/33 R |
| 3,616,222 | 10/1971 | Dasinger | 195/31 R |
| 3,642,580 | 2/1972 | Ghose | 195/33 R |
| 3,764,475 | 10/1973 | Mandels et al. | 195/33 R |
| 3,972,775 | 8/1976 | Wilke et al. | 195/33 R |
| 4,058,411 | 11/1977 | Bellamy et al. | 195/31 R |
| 4,089,745 | 5/1978 | Antrim et al. | 195/33 R |
| 4,097,333 | 6/1978 | Freytag et al. | 195/33 R |
| 4,104,124 | 8/1978 | Srinivasan et al. | 195/33 R |
| 4,110,475 | 8/1978 | Singer | 195/33 R |
| 4,160,695 | 7/1979 | Dietrichs et al. | 195/33 R |

OTHER PUBLICATIONS

Dhawan et al., "Enzymatic Hydrolysis of Common Cellulosic Waste by Cellulose", J. Gen. Appl. Microbiol., 23, 155–161 (1977).
N. Toyama, "Feasability of Sugar Production from Agricultural and Urban Cellulosic Wastes with Trichoderma viride Cellulase", Biotechnol. & Bioeng. Symp., No. 6, pp. 207–219 (1976).
R. K. Andren et al., "Production of Sugars from Waste Cellulose by Enzymatic Hydrolysis. & Primary Evaluation of Substrates", Applied Polymer Symposium No. 28, pp. 205–219 (1979).
M. Mandels et al., "Recent Advances in Cellulose Technology", J. Ferment. Technol., 54, No. 4, pp. 267–286 (1976).
M. Mandels et al., "Enzymatic Hydrolysis of Waste Cellulose", Biotechnol. and Bioeng., XVI pp. 1471–1493 (1974).
L. A. Spano et al., "Pretreatment and Substrate Evaluation for the Enzymatic Hydrolysis of Cellulosic Wastes", NTIS PB 272 104 (1974).
M. Mandels et al., "Disposal of Cellulosic Waste Materials by Enzymatic Hydrolysis", NTIS AD-750 351, (1972).

Primary Examiner—V. Millin
Attorney, Agent, or Firm—Arthur I. Palmer, Jr.

[57] ABSTRACT

A method for utilizing waste cellulosic material by conversion to sugars suitable for use in tobacco manufacturing is disclosed. The method comprises comminuting waste cellulose products, which are generated during tobacco product manufacturing, deesterifying any waste cellulose acetate present in the waste products, enzymatically saccharifying the deesterified and comminuted products to simple sugars and recovering the sugars produced. The recovered sugars may be utilized in tobacco treatment processes. Enzymatic saccharification is preferably effected with *Trichoderma viride* cellulases.

19 Claims, No Drawings

METHOD FOR RECYCLING CELLULOSIC WASTER MATERIALS FROM TOBACCO PRODUCT MANUFACTURE

BACKGROUND OF THE INVENTION (1) Field of the Invention

This invention relates to a method for deesterifying and enzymatically saccharifying cellulosic waste products of tobacco manufacture, whereby sugars suitable for use in various tobacco treatment processes are produced.

(2) Description of the Prior Art

During tobacco manufacture substantial amounts of waste filter material and cigarette paper are generated. Such waste materials generally have no utility in cigarette manufacture, but rather are typically disposed of by burning after separation from tobacco components. Disposal of these waste products and the economic losses incident thereto would be avoided if there were a means for converting the waste materials to a product useful in the manufacture of tobacco products.

Sugars, particularly glucose, are employed in a number of tobacco treatment processes. For example, sugars are employed as a carbon source during tobacco fermentations, such as denitrification. In addition, sugars may be employed as tobacco casing materials or in the production of tobacco flavorants.

The use of enzymes—particularly those from *Trichoderma viride*—to hydrolyze cellulosic materials to sugar syrups is known in the art. Further a variety of means have been proposed for improving enzymatic hydrolysis of waste cellulose to sugars. Comminution and acid and/or base pretreatments whereby cellulosic materials are rendered more susceptible to enzymatic degradation are among the prior art means suggested for improving enzymatic hydrolysis. However, such processes have not been applied to the waste cellulosic materials of tobacco manufacture. Moreover, cellulose acetate present in filter tow is resistant to enzymatic hydrolysis by cellulase or saccharification and the art fails to suggest any pretreatment thereof whereby recycling of this waste cellulose material could be effected.

SUMMARY OF THE INVENTION

The invention provides a method for utilizing cellulosic waste products generated during tobacco manufacture. The method comprises converting the waste products to sugars suitable for use in the manufacture of tobacco products. These cellulosic waste products may be recycled by (a) comminuting the cellulosic waste material;

(b) deesterifying the cellulose acetate present in waste material by treatment with a base;

(c) subjecting the comminuted and deesterified material to enzymatic saccharification under conditions which promote hydrolysis of cellulose to simple sugars;

(d) recovering the sugar produced in step c; and (e) employing the recovered sugar in a tobacco treatment process.

*Trichoderma viride* cellulases are particularly suitable enzymes for use in the practice of the invention.

DETAILED DESCRIPTION OF THE INVENTION

This invention relates to a method for recycling cellulosic waste products generated during tobacco product manufacture. The method comprises converting the waste cellulosic materials into sugars which are suitable for use in the manufacture of tobacco products without purification.

Broadly stated, the method comprises subjecting cellulosic waste material, preferably in comminuted form, to enzymatic saccharification. Cellulose acetate present in the material is deesterified prior to saccharification. The sugars produced are recovered whereupon they may be utilized in tobacco casing, flavorants or fermentation processes.

More specifically the method of the invention comprises subjecting cellulosic waste materials generated during tobacco product manufacture to enzymatic saccharification under conditions conducive to hydrolysis of cellulose to simple sugars. Cellulose acetate waste material is additionally deesterified by means of a base prior to saccharification. Further, the waste materials are preferably comminuted prior to saccharification. The sugars produced during the saccharification step are isolated and employed in tobacco treatment processes.

For purposes of the present invention, cellulosic waste material or products are to be understood to include materials such as cigarette paper, tipping paper and filter tow. Tobacco waste, such as tobacco dust, may also be treated by the method of the invention.

Cigarette papers and tipping papers are made of processed cellulosic materials. Upon conversion of this material to pulp, it is possible to hydrolyze it to sugar syrup by means of enzymes. In contrast, filter tow is made of cellulose acetate which is resistant to enzymatic saccharification. By deesterification of the cellulose acetate, it is possible to render it susceptible to enzymatic hydrolysis.

The preliminary deesterification of the filter tow (cellulose acetate) can be effected by conventional deesterification techniques. One means which has been found particularly suitable for purposes of the present invention is hydrolysis of the cellulose acetate employing a base, such as an alkali metal hydroxide. Specific suitable hydroxides are sodium and potassium hydroxide.

Deesterification of cellulose acetate sufficiently to permit enzymatic saccharification can be effected under a variety of conditions. Generally, factors such as increased concentration of base, increased times, increased temperatures, increased pressures and the like will increase the rate and/or degree of cellulose acetate deesterification. Immersion of cellulose acetate in 1 N sodium hydroxide for two or more hours at room temperature is an example of a treatment which has been found to render cellulose acetate in filter tow susceptible to enzyme treatment.

The deesterified material is preferably washed to neutral before undertaking enzymatic treatment. Further to permit ready saccharification, both the deesterified material and the waste cellulosic paper materials are preferably comminuted and suspended in water. Such comminution increases the surface area subject to enzymatic treatment. Comminution may be effected by conventional techniques including use of a Waring blender, a hammer or ball mill, a conventional paper shredder or the like. It is most preferable to effect comminution of the filter tow prior to deesterification.

Following comminution and deesterification the cellulosic materials are subjected to enzymatic saccharification under conditions conducive to conversion of cellulose to simple sugars. Use of cellulase produced by microorgaisms such as *Aspergillus niger, Cellulomonas* sp., *Myrothecium verrucaria, Peniccillium expansum,* and various strains of *Trichoderma viride* such as ATCC 13631, 24449, 26920, and 26921 is possible. The most commonly used enzymes in such processes are the cellulases derived from *Trichoderma viride.* These cellulases possess sufficient $C_1$, $C_x$ and cellobiase activities to hydrolyze highly crystalline cellulosic materials to sugar syrups. A cellulase found effective for purposes of the invention is that derived from the *T. viride longibrachiatum* QM 9414 (ATCC 26921), available from the American Type Culture Collection, Rockville, Maryland 20852. Other enzymes containing all of the components required for hydrolysis of insoluble cellulose to simple sugars may also be employed. Procedures used for the preparation of cellulase are disclosed generally by Mandels and Sternberg in "Recent Advances in Cellulase Technology." *Journal of Fermentation Technology,* 54(4), 1976, pages 267–286, incorporated by reference herein.

The conditions suitable for saccharification of cellulose to soluble sugars are known in the art. Optimum enzyme action with *T. viride* cellulases is generally achieved at about 25°–50° C. and pH 4.0–5.0. In the practice of the present invention, saccharification at about pH 4.8 and 50° C. with reasonable agitation employing about 9,000 to 15,000 units total cellulase activities/l for up to about 25 g/l of cellulose solids has been found the effect substantially complete conversion of the cellulosic waste materials to simple sugars in a reasonable time.

Suitable buffers for purposes of the saccharification process are citrate buffer and acetate buffer. Alternatively, the potassium acetate generated during the deesterification step in combination with acetic acid can be used as the buffer.

The sugar syrup generated as a result of the saccharification of the waste materials may be isolated from any residual cellulose by conventional techniques. Centrifugation, straining or filtration may be employed to this end. Typically the sugar syrups comprise glucose, cellobiose and xylose and require no purification prior to use. The cellobiose may be further reduced to glucose by means of cellobiase according to known techniques. Such cellobiase treatment can be effected in the same vessel as that wherein the cellulase treatment is effected and may be effected simultaneously with or following the cellulase treatment.

The sugar syrups may be used in any tobacco treatment process employing sugars. For example, the syrups produced may be employed without purification as a carbon source for tobacco fermentation processes, including denitrification fermentation. Alternatively the syrups may be concentrated and used as tobacco casing material. The sugars may also be employed in reaction flavor production or in glycerol production.

The following examples are illustrative of the invention:

EXAMPLE 1

Five grams of cellulose acetate from filter tow was stirred with 100 ml of 1 N KOH for 12 hours at room temperature. The material was thereupon separated by centrifugation and the residue was washed with water until neutral. To the neutralized residue were added 40 ml of 0.5 M citrate buffer at pH 4.8 and 10 ml cellulase solution which contained 750 units total cellulases from *Trichoderma viride* longibrachiatum in citrate buffer solution. The resulting solution was incubated at 50° C. for 24 hours. Thereafter the solution was centrifuged and the supernatant was subjected to sugar analysis using the DNS procedure. The optical density (O.D.) of the test sample at 500 mu=$1.26 \times 20$ (dilution factor). The O.D. of 0.3 mg of a glucose standard in turn was 0.25. The sugar content of the test sample was thus computed as follows:

$$\frac{1.26 \times 20}{0.25} \times 0.3 = 30.2 \text{ mg glucose/ml}$$

The percent conversion of the original 5000 mg of cellulose acetate to sugar was thus $$\frac{30.2 \times 50}{5000} \times 100 = 30.2\%$$

EXAMPLE 2

Filter tow was subjected to the deesterfication treatment and washing described in Example 1. Four 1.25 g deesterified test samples were combined with 50 ml of pH 4.8, 0.5 M citrate buffer and sufficient cellulase to produce the concentration of enzyme set forth in the table below. Fifty ml of the buffer and 5 ml of the cellulase solution was added to this control. The optical density of each sample was tested at 16, 24, 48 and 72 hours. The sugar content and % conversion in each sample was thereupon calculated. The results are set forth in the following table.

TABLE 1

| Enzyme units/55 ml | Time | Sugar produced (mg/ml) | % Conversion |
|---|---|---|---|
| 150 | 24 hours | 13.92 | 55.7 |
|  | 48 hours | 17.52 | 70.1 |
| 300 | 24 hours | 19.4 | 77.6 |
|  | 48 hours | 23.5 | 84.0 |
| 450 | 24 hours | 21.6 | 86.4 |
|  | 48 hours | 23.5 | 94.0 |
| 750 | 24 hours | 23.5 | 94.0 |
|  | 48 hours | 23.5 | 94.0 |

These results indicate substantially complete conversion to reducing sugars with concentrations of 900 units/55 ml or more of enzyme.

EXAMPLE 3

In order to evaluate the effects of different solids content on the degree of hydrolysis, test samples containing incremental amounts of cellulose acetate from filter tow treated as in Example 1 were subjected to cellulose saccharification. Each sample contained the indicated amounts of filter material, 50 ml of 0.5 M citrate buffer and 5 ml cellulase enzyme composition (750 units). The results are set forth in Table 2.

TABLE 2

| Solid Content (g/50 ml buffer) | Time (hrs) | Sugar produced (mg/ml) | % Conversion |
|---|---|---|---|
| 1.25 | 6 | 16.6 | 66.2 |
|  | 12 | 23.5 | 94.0 |
|  | 24 | 26.4 | 100.0 |
| 2.50 | 12 | 26.6 | 53.2 |
|  | 24 | 35.5 | 71.0 |
|  | 48 | 39.36 | 78.7 |
| 3.75 | 12 | 30.7 | 41.0 |
|  | 24 | 37.9 | 50.5 |

TABLE 2-continued

| Solid Content (g/50 ml buffer) | Time (hrs) | Sugar produced (mg/ml) | % Conversion |
|---|---|---|---|
| | 48 | 45.6 | 60.8 |

It is evident that with cellulose contents of about 1.25 g/50 ml (i.e., 25 g/l) result in substantially complete sugar conversion within 12-24 hours. Above this level diminished conversion rates are observed, but the sugar concentrations were increased.

EXAMPLE 4

To determine the effects of the time of deesterification of cellulose acetate on the conversion of the cellulose acetate to sugars, 1.25 g samples of cellulose acetate from filter tow was immersed in 50 ml of 1 N NaOH at room temperature for the times indicated in Table 3. Each sample was thereupon filtered, washed to neutrality and dried. The deesterified material was suspended in 50 ml of 0.5 M citrate buffer at pH 4.8 and 5 ml enzyme solution (750 units) was added. The mixture was incubated at 50° C. for 6 and 12 hours. The results of these experiments are set forth in Table 3.

TABLE 3

| Length of Deesterification (Hrs.) | Incubation Period (Hrs.) | Sugar Produced (mg/ml) | % Conversion |
|---|---|---|---|
| 1 | 6 | 12.24 | 48.96 |
| | 12 | 15.36 | 61.4 |
| 2 | 6 | 13.68 | 54.7 |
| | 12 | 18.7 | 74.9 |
| 4 | 6 | 14.16 | 56.6 |
| | 12 | 17.5 | 70.0 |
| 6 | 6 | 12.7 | 50.9 |
| | 12 | 17.3 | 69.1 |
| 12 | 6 | 15.4 | 61.4 |
| | 12 | 17.8 | 71.04 |

These results suggest that treatment of filter tow with 1 N NaOH for 2 hours at room temperature is adequate to render the cellulose acetate susceptible to cellulase hydrolysis.

Confirmation of the deesterification of the cellulose was obtained by the FT-IR gas evolution method, which showed that the deesterified material had significantly reduced acetic acid formation and greatly increased furfural formation as compared with the untreated cellulose acetate. The formation of glucose and cellobiose after the cellulase treatment was also indicative of the deesterification of the cellulose acetate.

EXAMPLE 5

Ten grams of waste shredded cigarette papers was blended with 500 ml of distilled water for five minutes at maximum speed in a Waring blender. The pH of the resulting pulp was adjusted to 4.8 with 0.1 M citric acid. One hundred ml of the pulp was combined with each enzyme solution comprising the indicated amounts of enzyme. The mixtures were thereupon incubated at 50° C. in a rotary water bath shaker at 100 rpm agitation rate. After the specified incubation periods, the mixtures were filtered and the amounts of reducing sugars formed in the filtrates were determined. The results of these tests are set forth in Table 4.

TABLE 4

| Enzyme Concentration (units/100 ml) | Time (Hrs.) | Reduced Sugars (mg/ml) | % Conversion |
|---|---|---|---|
| 30 | 0 | 0 | 0 |
| | 16 | 0.2 | 1.0 |
| | 24 | 0.8 | 3.2 |
| | 48 | 0.8 | 3.2 |
| | 72 | 0.7 | 2.8 |
| 90 | 0 | 0 | 0 |
| | 16 | 1.0 | 3.8 |
| | 24 | 1.6 | 6.4 |
| | 48 | 2.2 | 8.6 |
| | 72 | 5.2 | 20.8 |
| 150 | 0 | 0 | 0 |
| | 16 | 2.4 | 9.6 |
| | 24 | 3.0 | 12.0 |
| | 48 | 7.4 | 29.6 |
| | 72 | 7.9 | 31.7 |
| 300 | 0 | 0 | 0 |
| | 24 | 7.4 | 29.8 |
| | 48 | 11.1 | 44.0 |
| | 72 | 7.3 | 31.3 |
| 600 | 0 | 0 | 0 |
| | 24 | 9.8 | 39.4 |
| | 48 | 11.8 | 47.0 |
| | 72 | 15.1 | 60.5 |
| 900 | 0 | 0 | 0 |
| | 24 | 10.8 | 43.2 |
| | 48 | 15.4 | 61.6 |
| | 72 | 15.8 | 63.4 |
| 1500 | 24 | 14.9 | 59.5 |
| 3000 | 24 | 18.2 | 73.0 |

EXAMPLE 6

Two and one-half grams of cellulose acetate from filter tow was suspended in 100 ml of 0.1 M citrate buffer, pH 4.8. Ten ml of cellulase solution comprising 1500 units of total cellulase activity in citrate buffer solution was then added to the suspension. The suspension was thereupon incubated at 50° C. Samples were taken at the end of 24, 48 and 72 hour incubation periods. The results are set forth in Table 5.

TABLE 5

| Length of Hydrolysis (hr) | Sugars Formed (mg/ml) | % Conversion (%) |
|---|---|---|
| 24 | 0 | 0 |
| 48 | 0.28 | 1.1 |
| 72 | 0.31 | 1.2 |

These results demonstrate that untreated filter tow is not susceptible to saccharification by *T. viride* cellulase.

EXAMPLE 7

The sample from Example 3, containing 26.4 mg/ml of reducing sugars was subjected to gas chromatographic analysis. This analysis indicated the following sugar concentrations.

TABLE 6

| Sugars | Concentration (mg/ml) |
|---|---|
| Glucose | 11.2 |
| Cellobiose | 12.6 |
| Unknown | 14.2 |

The unidentified peak could be some intermediate polysaccharides due to partial hydrolysis of the cellulose.

EXAMPLE 8

One hundred ml of the sugar mixture analyzed in Example 7 was subjected to a further enzymatic hydrolysis treatment in order to evaluate the conversion of cellobiose therein to glucose. One hundred fifty units of cellobiase were added to the mixture and incubated at 40° C. for 2 hours. The sugar mixture was then subjected to gas chromatographic analysis for identification. The results are listed below.

TABLE 7

| Sugars | Before Treatment | After Cellobiase Treatment |
|---|---|---|
| Glucose, mg/ml | 11.2 | 21.8 |
| Cellobiose, mg/ml | 12.6 | 2.2 |
| Unknown, mg/ml | 14.2 | 16.4 |

These results indicate that such a two-stage treatment maximizes the quantity of glucose obtained from the hydrolysis of treated cellulose acetate.

EXAMPLE 9

The feasibility of utilizing the sugar formed from the enzymatic hydrolysis of deesterified cellulose acetate as a carbon source in denitrification was evaluated. The sugar solution from Example 8 was diluted to give 10 g glucose/l. The pH was adjusted to 7.0 with $K_2HPO_4$ powder. The following components were added to the buffered sugar solution: $NH_4Cl = 1$ g/l; $MgSO_4 \cdot 7H_2O = 0.2$ g/l; $FeCl_3 = 2.0$ mg/l; and $KNO_3 = 10$ g/l.

Two hundred fifty (250) ml of the mixture was sterilized by Milipore filtration and placed in a sterile 1 L flask. Twenty (20) ml of *Paracoccus denitrificans* ATCC 19367 at exponential growth stage was inoculated into the mixture in the flask. The inoculated mixture was then incubated at 35° C. in a New Brunswick Scientific Company water bath shaker. After 12 hours, the nitrate-nitrogen content was determined by an Orion Model 93-07 nitrate ion electrode. The results are listed below:

|  | With 10g glucose/l | With 10g glucose/l from CA | No glucose |
|---|---|---|---|
| Initial $NO_3^-$—N (ppm) | 1360 | 1360 | 1360 |
| Final $NO_3^-$—N (ppm) (12 hrs) | 0 | 0 | 1360 |

The results clearly indicate that glucose is needed in denitrification and that the glucose produced from the enzymatic hydrolysis of deesterified cellulose acetate as well as reclaimed cigarette paper functioned as well as a chemical grade glucose for a denitrification fermentation process.

We claim:

1. A method of recycling cellulosic waste material generated during tobacco manufacturing which comprises:
   (a) subjecting the cellulosic waste material to enzymatic saccharification under conditions which promote hydrolysis of cellulose to simple sugars;
   (b) recovering the sugar produced in step (a); and
   (c) employing the recovered sugar in a tobacco treatment process.

2. The method of claim 1 which further comprises comminuting the waste material prior to saccharification.

3. The method of claim 1 which further comprises deesterifying cellulose acetate present in the waste material by treatment with a base prior to saccharification.

4. The method of claim 3 which further comprises comminuting the cellulose acetate prior to deesterification.

5. The method of claim 3 wherein the base is an alkali metal hyroxide.

6. The method of claim 1 wherein an enzyme having $C_1$, $C_x$ and cellobiase activities is employed.

7. The method of claim 1 wherein a *Trichoderma viride* cellulase is employed to effect enzymatic saccharification.

8. The method of claim 7 wherein the saccharification is effected at about 25°–50° C. and pH of about 4.0–5.0.

9. The method of claim 7 wherein the saccharification is effected at about pH 4.8 and about 50° C.

10. The method of claim 7 wherein about 9,000 to 15,000 units total cellulase activity/l is employed for up to about 25 g/l of solid cellulose waste material.

11. A method for converting cellulose waste material generated during tobacco product manufacture into sugars suitable for use in the manufacture of tobacco products comprising:
    (a) comminuting the cellulose waste material;
    (b) subjecting the comminuted waste material to enzymatic saccharification under conditions which promote hydrolysis of cellulose to simple sugars; and
    (c) recovering the sugar produced in step (b).

12. The method of claim 11 which further comprises deesterifying cellulose acetate present in the waste material by treatment with a base prior to saccharification.

13. The method of claim 12 wherein comminution of the cellulose acetate is effected prior to deesterification.

14. The method of claim 12 wherein the base is an alkali metal hydroxide.

15. The method of claim 11 wherein a *Trichoderma viride* cellulase is employed to effect enzymatic saccharification.

16. The method of claim 15 wherein the saccharification is effected at about 25°–50° C. and pH of about 4.0–5.0.

17. The method of claim 15 wherein the saccharification is effected at about pH 4.8 and about 50° C.

18. The method of claim 15 wherein about 9,000 to 15,000 units total cellulase activity/l is employed for up to about 25 g/l of solid cellulose waste material.

19. The method of claim 11 wherein the recovered sugar of step (c) is utilized as a carbon source for a microbial denitrification process.

* * * * *